(12) United States Patent
Famolari

(10) Patent No.: US 7,904,089 B2
(45) Date of Patent: *Mar. 8, 2011

(54) SEAMLESS MOBILITY FOR A MULTIPLE INTERFACE DEVICE IN A CO-LOCATED WIRELESS ENVIRONMENT

(75) Inventor: David Famolari, Stewartsville, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/754,242

(22) Filed: Apr. 5, 2010

(65) Prior Publication Data

US 2010/0189078 A1     Jul. 29, 2010

Related U.S. Application Data

(62) Division of application No. 11/161,915, filed on Aug. 22, 2005, now Pat. No. 7,711,369.

(51) Int. Cl.
*H04W 36/00* (2009.01)
(52) U.S. Cl. ........ 455/442; 370/334; 455/336; 455/552.1
(58) Field of Classification Search .......... 455/436–444, 455/422.1, 552.1; 370/331–334
See application file for complete search history.

(56) References Cited

U.S. PATENT DOCUMENTS

| | | | |
|---|---|---|---|
| 6,128,287 A | 10/2000 | Freeburg et al. | |
| 6,307,849 B1 | 10/2001 | Tiedemann, Jr. | |
| 6,574,668 B1 | 6/2003 | Gubbi et al. | |
| 6,901,063 B2 | 5/2005 | Vayanos et al. | |
| 2003/0086427 A1 | 5/2003 | Lee et al. | |
| 2004/0218617 A1 | 11/2004 | Sagfors | |
| 2005/0063303 A1 | 3/2005 | Samuels et al. | |

FOREIGN PATENT DOCUMENTS

EP     1370041 A1 *  12/2003

OTHER PUBLICATIONS

The present application is a divisional of U.S. Appl. No. 11/161,915. The references submitted herewith were all cited in said U.S. Appl. No. 11/161,915.
Search Report from corresponding PCT/US2006/32823—i.e., see corresponding PCT/US2006/32823.
Written Opinion from corresponding PCT/US2006/32823—i.e., see corresponding PCT/US2006/32823.

* cited by examiner

*Primary Examiner* — Kamran Afshar
*Assistant Examiner* — Vladimir Magloire
(74) *Attorney, Agent, or Firm* — Watchstone P&D, PLLC

(57) ABSTRACT

Data packets are transmitted from a first access network to a first interface of a multiple interface device (MID), and identical data packets are transmitted concurrently from a second access network to a second interface of the MID. Some of the data packets that are transmitted to the MID from the first access network are not received by the first interface. The MID inspects identifiers of data packets from the first and second interfaces in order to send to the application a stream including all of the data packets. For example, the MID sends to the application the data packets from the first interface, buffers the data packets from the second interface, and sends data packets from the buffer to the application upon detecting that data packets in the buffer were transmitted to the first interface but not received by the first interface.

22 Claims, 8 Drawing Sheets

SEAMLESS MOBILITY FOR A MULTIPLE INTERFACE DEVICE IN A CO-LOCATED WIRELESS ENVIRONMENT

BACKGROUND

1. Field of the Invention

The present invention relates generally to wireless networks, and specifically to enabling seamless mobility for a multiple interface device in a co-located wireless environment.

2. Background of the Invention

Wide area cellular networks are being upgraded to support the Internet Protocol (IP). This will allow people to surf the web, check e-mail and access the Internet anywhere they could previously make a cellular phone call. These new wide area wireless systems are generally called third generation, or 3G, systems. They will offer bandwidths comparable to a few dial-up modem connections (usually up to 144 Kbps) to practically anywhere.

Coincident with this deployment of wide-area wireless networks is an increased deployment of so-called wireless local area networks (WLANs). These WLANs service areas on the order of 100 meters, use unlicensed spectrum, and offer top speeds on the order of 4-5 Mbps. Many WLAN systems are being deployed in shopping malls, coffeehouses, theaters, bookstores, public parks, etc. In the future these two systems, 3G and WLAN, will often service the same coverage area. This situation leads to what is called a co-located wireless environment. In such an environment a properly equipped mobile device is capable of, and has the option to, access the 3G network as well as the WLAN network.

More and more devices are being equipped with multiple interfaces, or the capability of supporting multiple interfaces. Almost all laptop devices today come with two PCMCIA slots that allow network interface cards to be plugged into the computer. Similarly many palm-top and Personal Data Assistant (PDA) devices come equipped with PCMCIA slots or Compact-Flash (CF) slots that allow for the same plug-in functionality.

Additionally many laptop and mobile device manufacturers are building embedded interfaces into their products. This means that a laptop comes pre-equipped with network access capabilities. This class of devices will be referred to as Multiple Interface Devices (MIDs). A MID is a device having the ability to communicate over more than one access network at the same time. One example of a MID is a laptop computer having an IEEE 802.11 PCMCIA card and a GSM or CDMA PCMCIA card. Another example of a MID is a cellular telephone having a CDMA radio and an embedded Bluetooth radio. Still another example of a MID is a PDA having a cellular radio attachment and an IEEE 802.11 interface.

Seamless mobility refers to an ability of a mobile device to change its point of attachment to a network (i.e., handoff) while not causing any noticeable disruption in service quality or disabling any active communication sessions. When mobile devices use IP protocols to communicate they are identified by a unique IP address. Traditionally the IP protocols where developed to handle fixed networks where there was no mobility. As such each IP address not only represents a mobile terminal's identity on the network, but also its location. This linking of identity with location causes problems when a mobile terminal is moved.

When a mobile terminal moves from one point of attachment to another point of attachment that is in a different subnet, it must acquire a new IP address in order to communicate. However, when it gets a new IP address it can longer receive information that was addressed to its old IP address. Consequently any on-going active sessions with the mobile terminal are disrupted and broken.

The industry has developed a suite of protocols, called Mobile IP, that address this mobility problem. See, for example, C. Perkins, Editor, "IP Mobility Support," Request for Comments: 2002, Network Working Group, IBM Corporation, October 1996. Standard Mobile IP allows a mobile terminal to change points of attachment and continue to receive packets from on-going sessions, although there is small period of time when the mobile terminal is being configured and is unable to receive packets. There have been a number of industry efforts to reduce this configuration time, and consequently improve the user experience by making it more seamless, in what are called fast-handoff procedures.

More specifically, Mobile IP protocols assign a unique permanent Home Address to a mobile terminal. The mobile terminal will always use this address in all of its communications. Mobile IP also specifies mobility agents that exist in both the home network and in visited networks that assist in the mobility procedure. The Home Agent (HA) exists in the home network and manages all the traffic for the mobile terminal. An optional Foreign Agent (FA) exists in visited networks. When a mobile terminal moves from its home network to a visited network, it receives a new IP address, called a care-of address. Within the FA-mode, the mobile terminal will inform the FA of this address, its home address, and the address of its HA. The FA will then forward a Registration Request to the HA. The HA will accept this request and store a mobility binding that links that mobile's home address with the newly acquired care-of address. All traffic destined to the mobile terminal will be addressed to the mobile terminal's home address. The HA will intercept this traffic, consult the mobility binding for the mobile terminal, determine the proper care-of address associated with the mobile terminal's home address, and forward the packet to that care-of address. The Home Agent acts as an administrative assistant that forwards packets to the mobile terminal's new location. Anyone communicating with the mobile terminal is completely unaware of the fact that the mobile terminal has moved.

Mobile devices that have only one interface will experience a "black-out" period when they are unable to receive information. This black-out period lasts from the time that the mobile device acquires its new care-of address to the time that the HA registers that care-of address in its mobility binding.

SUMMARY OF THE INVENTION

In accordance with a first aspect, the invention provides a method of enabling seamless mobility for a multiple interface device in a co-located wireless environment in which data packets are transmitted to the multiple interface device from a first access network and identical data packets are transmitted concurrently to the multiple interface device from a second access network, and the data packets include identifiers for identifying the data packets. The method includes the multiple interface device receiving a first stream of the data packets from the first access network at a first interface and receiving a second stream of the data packets from the second access network at a second interface, wherein some of the data packets that are transmitted to the multiple interface device from the first access network are not received by the first interface and are therefore missing from the first stream of the data packets. The method further includes the multiple interface device inspecting the identifiers of data packets in the first stream and identifiers of data packets in the second stream in order to combine data packets from the first stream with data packets from the second stream to produce a third stream of data packets received by an application of the multiple interface device, so that the third stream of data packets includes the data packets that are transmitted to the multiple interface device from the first access network and are not received by the first interface and are therefore missing from the first stream of the data packets.

In accordance with another aspect, the invention provides a method of enabling seamless mobility for a multiple interface device in a co-located wireless Internet Protocol (IP) network environment in which IP data packets are transmitted to the multiple interface device from a first access network and identical IP data packets are transmitted concurrently to the multiple interface device from a second access network. The method includes the multiple interface device receiving a first stream of the IP data packets from the first access network at a first interface and receiving a second stream of the IP data packets from the second access network at a second interface, wherein some of the IP data packets that are transmitted to the multiple interface device from the first access network are not received by the first interface. The method further includes the multiple interface device forwarding the IP data packets received from the first access network at the first interface to the application, storing in a buffer IP data packets received from the second access network at the second interface, and upon detecting that IP data packets in the buffer are missing from the first stream of the data packets received from the first access network at the first interface, forwarding the missing IP data packets from the buffer to the application.

In accordance with still another aspect, the invention provides a multiple interface device having seamless mobility in a co-located wireless network environment in which data packets are transmitted to the multiple interface device from a first access network and identical data packets are transmitted concurrently to the multiple interface device from a second access network, wherein some of the data packets that are transmitted to the multiple interface device from the first access network are not received by the multiple interface device. The multiple interface device includes at least one processor programmed for executing an application, a first wireless transceiver for receiving a first stream of the data packets from the first access network, and a second wireless transceiver for receiving a second stream of the data packets from the second access network. The at least one processor is further programmed for forwarding the data packets received by the first wireless transceiver to the application, for storing in a buffer data packets received by the second wireless transceiver, and upon detecting that data packets in the buffer are missing from the first stream of the data packets received by the first wireless transceiver, forwarding the missing data packets from the buffer to the application.

BRIEF DESCRIPTION OF THE DRAWINGS

Additional features and advantages of the invention will be described below
with reference to the drawings, in which.

Figure 1:
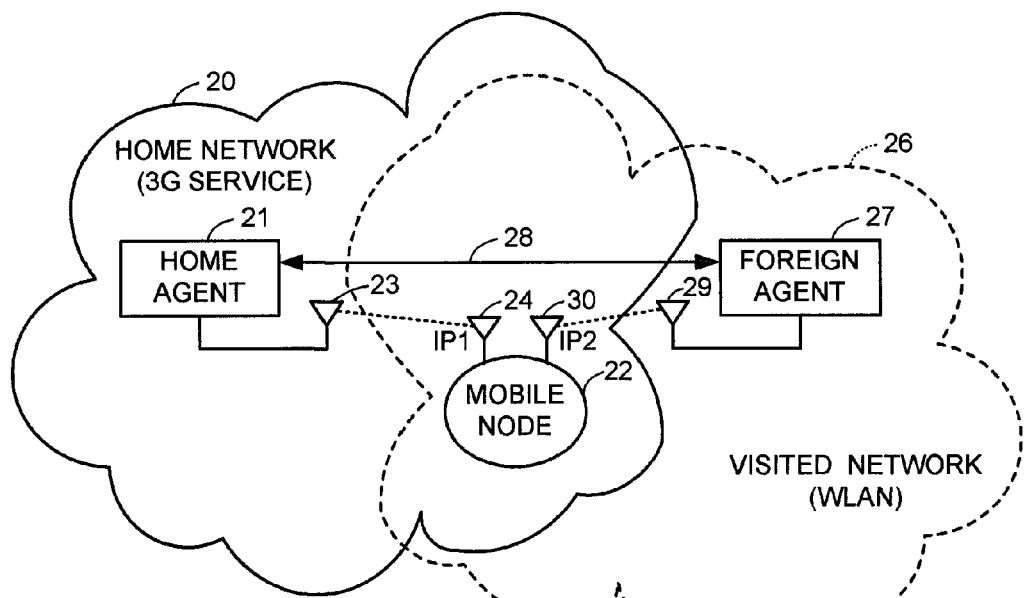
FIG. 1 is a schematic diagram of a co-located wireless environment.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a co-located wireless environment including a home network 20 having a home agent servicing a mobile node 22. For example, the home network 20 provides 3G service by the home agent 21 establishing a first tunnel to a first IP address IP1 for the mobile node. To set up this first tunnel, the home agent 21 has an antenna 23 providing a radio frequency or microwave link with a first antenna 24 of the mobile node 22. The co-located wireless environment of FIG. 1 further includes a visited network 26 having a foreign agent 27 that may also service the mobile node 22. For example, the visited network 26 is a WLAN. The home agent 21 has a wireline link 28 to the foreign agent 27 for forwarding copies of IP packets destined for the mobile node 22. The foreign agent 27 establishes a second tunnel to a second IP address IP2 for the mobile node 22. The foreign agent 27, for example, has an antenna 29 providing a radio frequency or microwave link with a second antenna 30 of the mobile node 22.

The present invention is more particularly concerned with a way of providing seamless mobility to a multiple interface device such as the mobile node 22 in the co-located wireless environment of FIG. 1. Seamless mobility is achieved by ensuring that there is no "black out" period and no packet loss when the mobile node 22 exits its home network 20 while traveling further into the visited network 26. The following description will look specifically at the case where the home network is a 3G network and the visited network is a WLAN network, although the invention is applicable to any two independent access networks.

Figure 2:
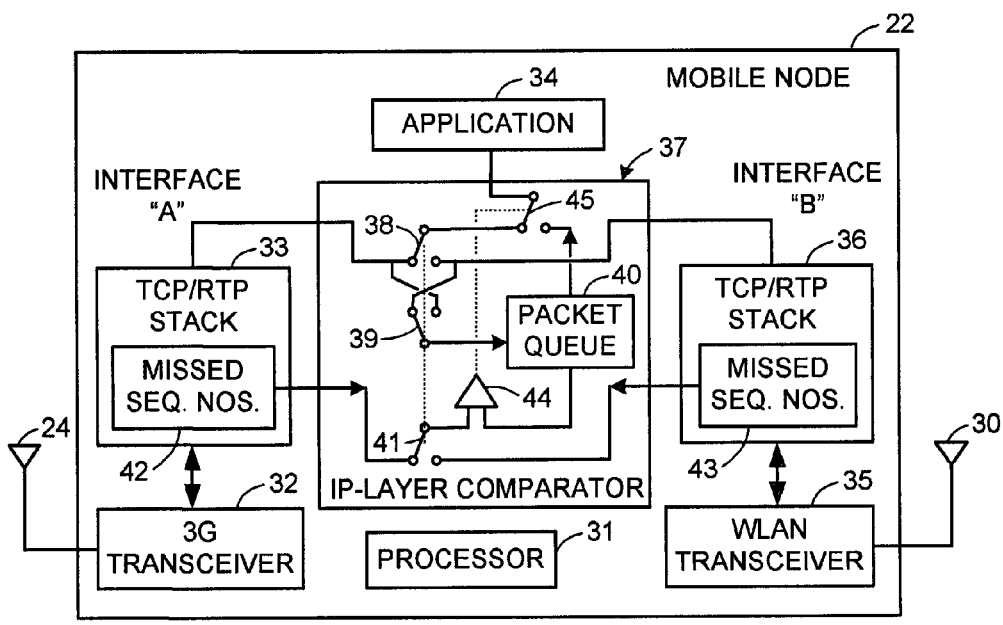
FIG. 2 is a block diagram of a mobile node including an IP-layer Comparator in accordance with the present invention.
Figure 3:
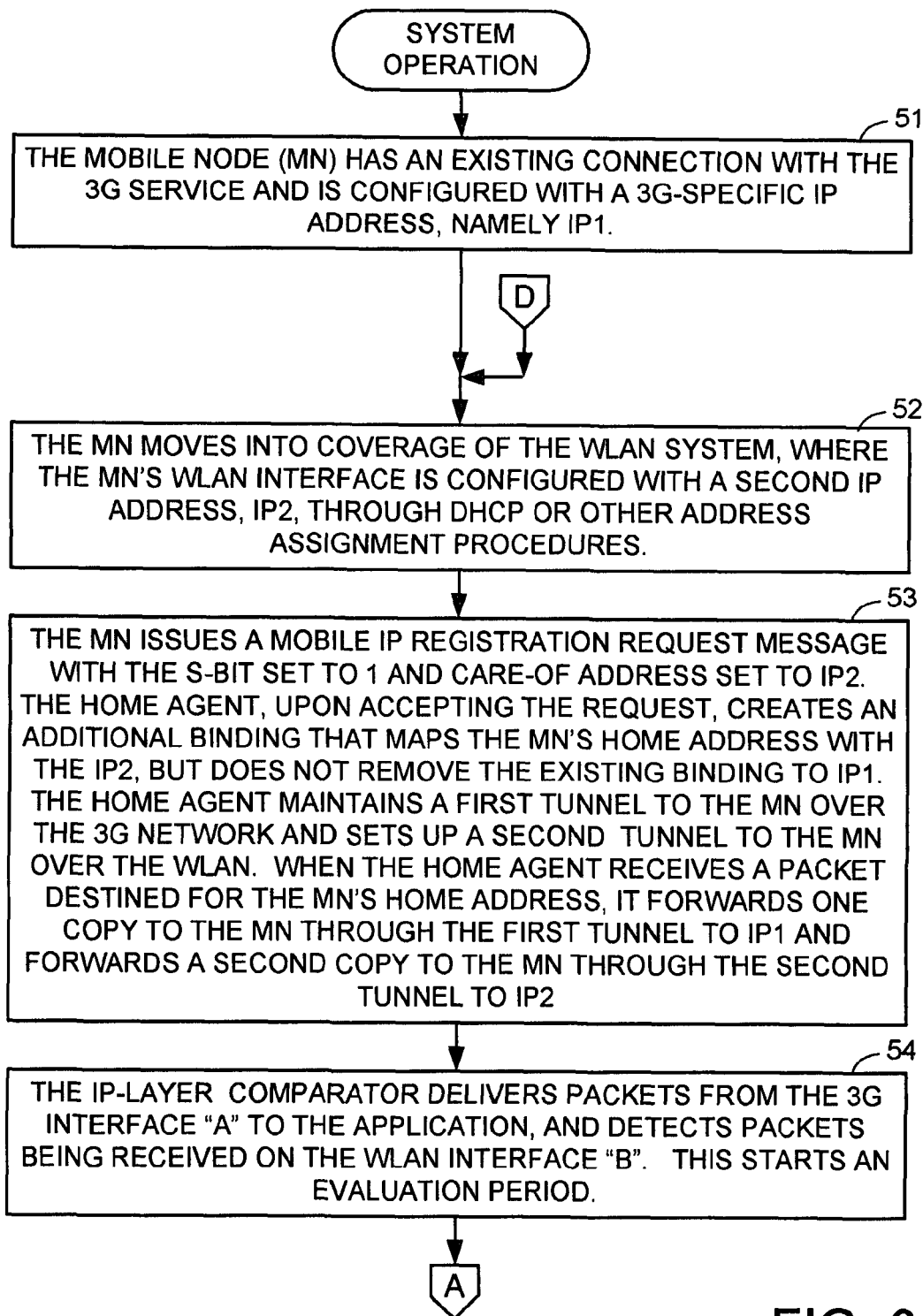
FIGS. 3 to 6 comprise a flowchart of the operation of the mobile node including the IP-layer Comparator of FIG. 2 during hand-off in the co-located wireless environment of FIG. 1.

FIG. 2 shows details of the mobile node 22 including an IP-layer Comparator 37 for providing seamless mobility. The mobile node 22 includes a processor 31, a 3G transceiver 32 coupled to the first antenna 24, a first TCP/RTP stack 33, and an application 34 such as a web browser or E-mail program. The 3G transceiver 32 and the first TCP/RTP stack 33 together comprise a first interface designated "A". The mobile node 22 has a second interface designated "B" comprising a WLAN transceiver 35 coupled to the second antenna 30, and a second TCP/RTP stack 36. The interface "A" and the interface "B" are capable of providing independent access to the two wireless IP networks (20 and 26 in FIG. 1) so that the mobile node 22 is a multiple interface device (MID).

When the mobile node 22 is co-located in the system of FIG. 1, both of the IP interfaces "A" and "B" are capable of receiving IP data packets, but as the mobile node moves in and out of the coverage area of either the home network or the visited network, there will be some missed packets that are transmitted from the respective wireless network and not received by the respective interface. In general, missed packets often occur due to a temporary failure of a mobile node to receive a transmitted wireless signal due to multi-path propagation or interference. Therefore, each TCP/RTP stack 33, 36 includes a facility 42, 43 for inspecting sequence numbers of the IP data packets in order to detect sequence numbers that have been skipped. The facility 42, 43 compiles a list of the missing sequence numbers and the time that each sequence number was found to be missing (i.e., the time of receipt of an IP packet having a higher sequence number than the missed sequence number). The facility 42, 43 also periodically checks whether or not a timeout period has elapsed since each missing sequence number was found to be missing, and upon finding that this timeout period has elapsed, the TCP/RTP stack returns a re-transmission request to the respective home or foreign agent so that the agent will retransmit the missing IP packet.

The IP-layer Comparator 37 provides for seamless mobility by selectively passing IP data packets from the interfaces A and B of the independent access networks to the application in such a way that one interface may supply data packets that are missing from the other interface so that unnecessary retransmission requests are eliminated.

In a preferred implementation, at any given time the IP-layer Comparator selects one of the interfaces "A" or "B" to pass IP data packets received by this selected interface immediately to the application, and data packets received by the other interface are passed to a packet queue 40. The packet queue 40 functions as a buffer that is ordered in terms of packet sequence number to facilitate the search for a packet having a given sequence number. The selected interface will be referred to as the primary interface, and the other interface will be referred to as the secondary interface. A switch 38 is shown in the IP-layer Comparator 37 for selecting the packets from the primary interface for passing these packets to the application 34, and a switch 39 is shown in the IP-layer Comparator for selecting the packets from the secondary interface for passing these packets to the packet queue 40. Also, as indicated by a comparator 44, the IP-layer Comparator 37 compares the missed sequence numbers in the selected primary interface to the sequence numbers of the IP data packets in the packet queue 40 to determine if and when a packet in the packet queue should be passed to the application 34. Therefore, the IP-layer Comparator 37 is shown to have a switch 41 for selecting missed sequence numbers from the primary interface, and a switch 45 controlled by the comparator 44 for passing a packet from the packet queue 40 to the application 34.

The function of comparator 44, for example, is performed by a program routine, as further described below with reference to FIGS. 7 to 9, that checks whether a data packet has been missing for a certain period of time that is less than the timeout period for initiating a retransmission request. Before the primary interface will initiate a retransmission request for a missing data packet, the comparator 37 checks whether the packet queue 40 contains a copy of the missing IP data packet. If so, the IP-layer Comparator forwards this packet from the packet queue 40 to the application, and the IP-layer Comparator informs the TCP/RTP stack 33, 36 of the primary interface that the packet is no longer missing so that the primary interface will not initiate a retransmission request.

In a preferred implementation, a simultaneous binding option available in the Mobile IP industry standards is used to implement IP-layer soft handoffs. For example, as described in the above-cited Request for Comments 2002, Section 3.3, a Mobile IP Registration Request messages contain a bit-field denoted by 'S'. When the S-bit is set to 1, the home agent 21 will create a simultaneous binding linking the mobile node 22 with a specified care-of address contained in the message. This binding will exist along with any previous bindings that were created for the mobile node and any prior care-of addresses. Intelligent setting of the S-bit is used to facilitate the desired seamless mobility.

FIGS. 3 to 6 show the preferred operation of the wireless system of FIG. 1 for the mobile node 22 having the IP-layer Comparator 37 of FIG. 2. In a first step 51 of FIG. 3, the mobile node (MN) has an existing connection with a 3G service and the MN's 3G interface "A" is configured with a 3G-specific IP address, namely IP1. At this time the MN is out of the coverage area of the WLAN system, so that the IP-layer Comparator selects the 3G interface "A" to be primary.

In step 52, the mobile node moves into coverage of the WLAN system, where the MN's WLAN interface "B" is configured with a second IP address, IP2, through the Dynamic Host Configuration Protocol (DHCP) or other address assignment procedures. At this point the MN has two IP configured interfaces.

In step 53, the MN issues a Mobile IP Registration Request message with the S-bit set to 1 and the care-of address set to IP2. The home agent, upon accepting the request, creates an additional binding that maps the MN's home address with the IP2. The home agent does NOT remove the existing binding that maps the MN home address to IP1, so that the home agent stores two bindings for the MN's home address, namely IP1 and IP2. The home agent establishes two tunnels to the MN, one over each access network, and forwards one copy of any packet that it receives that is destined for the MN's home address over one of the tunnels, and forwards another copy of the packet over the other tunnel. At this point, the MN has two incoming IP information streams, one coming in over the 3G access network and one coming in over the WLAN access network.

In step 54, the IP-layer Comparator of the MN delivers packets from the 3G interface "A" to the application. At this point the MN can compare the two incoming IP streams, if possible. This comparison is possible if the streams are associated with session-based applications that provide packet identifiers such as timestamps or sequence numbers, or otherwise mark IP packets to provide time information, either so that they can be reordered or can be discarded if they are considered "old". This is the case for both TCP connections and RTP connections, by far the two most important session-based protocols. Therefore the following description will consider TCP-based connections using TCP packets, or RTP-based connections using RTP packets. TCP packets provide a 32-bit sequence number while RTP packets provide both a sequence number and a timestamp value in each packet.

Except for any missing packets, the IP stream arriving at the 3G interface "A" is identical to the IP stream arriving at the WLAN interface "B". The two streams contain the same information, including TCP/IP headers (and RTP headers, if applicable). However the two streams may arrive at different times because of differences in transmission speeds between the two access networks. The IP-layer Comparator inspects both of these input streams and determines when one stream has "caught up" with the other stream.

In step 54, after the MN has moved into the WLAN coverage area and the WLAN interface "A" is configured with the care-of address IP 2, the IP-layer Comparator detects packets being received on the WLAN interface "B". This starts an evaluation period having a certain duration (EvalTime).

During the evaluation period, in step 55, the IP-layer Comparator inspects the TCP/RTP header information on packets coming from the WLAN interface "B" in addition to the packets coming from the 3G interface "A". The IP-layer Comparator continues to deliver packets from the 3G interface "A" to the application, and buffers in the packet queue all of the packets received from the WLAN interface "B".

During the evaluation period, in step 56, the IP-layer Comparator tracks the sequence numbers of the TCP/RTP packets received on both interface "A" and "B". When there is a gap or delay in receipt of the sequence numbers for the 3G interface "A" corresponding to sequence numbers that have arrived on the WLAN interface "B" such that the 3G interface "A" has "missed" a packet for a certain timeout period and this missed packet has been received on the WLAN interface "B", the IP-layer Comparator will deliver a copy of the missed packet from the packet queue and instruct the TCP/RTP stack on the 3G interface "A" to not include this packet in any retransmission request. This has the effect of providing reception diversity for the mobile device.

The following is a specific example. Suppose the WLAN interface "B" has delivered a packet with sequence number 4 to the packet queue, and the 3G interface "A" has delivered to the application a packet with sequence number 3. After a timeout value of TIMEOUT seconds, the 3G interface "A" has not yet received packet 4, so the IP-layer Comparator delivers the packet with sequence number 4 from the packet queue to the application. The IP-layer Comparator also instructs the 3G interface "A" not to request a retransmission of the packet with sequence number 4, so that when the 3G interface "A" receives a packet with sequence number 5, the 3G interface "A" will not send a retransmission request for packet 4. In this fashion, the IP-layer Comparator prevents a needless retransmission of a packet that has already been successfully processed.

In step 57, at the end of the evaluation period, execution continues to step 58. In step 58, If the TCP/RTP packet sequence number coming from the WLAN interface "B" (SEQ_NO_B) is greater than the TCP/RTP packet sequence number coming from the 3G interface "A" (SEQ_NO_A), then execution branches to step 63 in FIG. 6. Otherwise, execution continues from step 58 to step 59 in FIG. 5.

Figure 5:
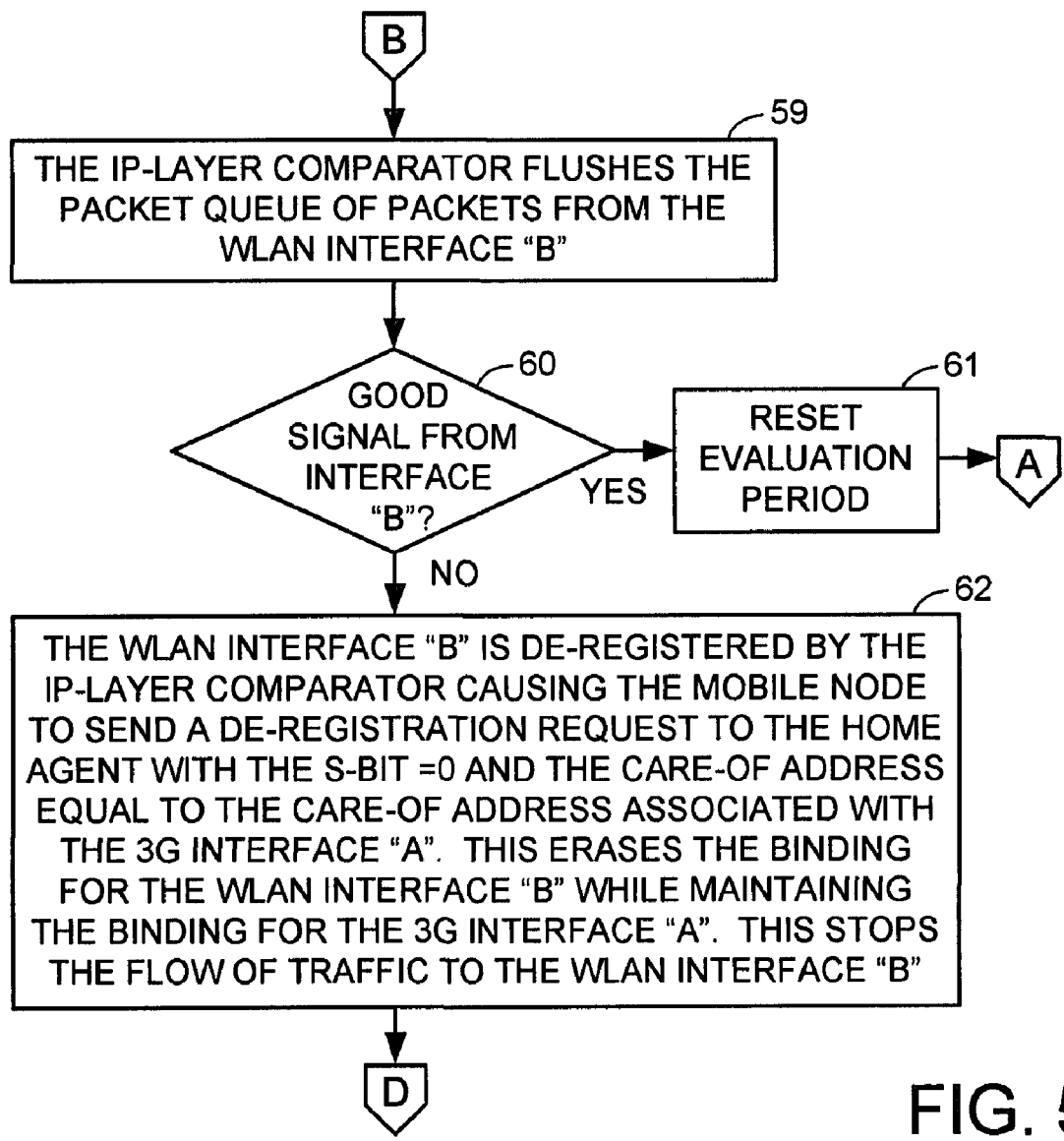

Upon reaching step 59 of FIG. 5, the TCP/RTP packet sequence numbers coming from the 3G interface "A" (these are the packets that are being delivered to the application) are greater than the sequence numbers coming from the WLAN interface "B", so that the information stream on the WLAN interface "B" has not caught up to that of interface A. Therefore in step 59 the IP-layer Comparator flushes the packet queue of all of the buffered packets from the WLAN interface "B" (because they are no longer useful), and execution continues to step 60.

In step 60, the IP-layer Comparator evaluates the signal level from the WLAN interface to determine whether or not it is still useful to support the IP connection over the WLAN. The usefulness of the IP connection from the WLAN could take into consideration a received signal strength indication from the WLAN transceiver if such a signal strength indication is provided by the WLAN transceiver. In any case, the IP-layer Comparator can estimate the merit of the signal from the WLAN transceiver by inspecting sequence numbers of packets in the packet queue to compute a ratio of the number of skipped packets to the number of received packets in the packet queue, and then compare this ratio to a predetermined threshold.

Figure 4:
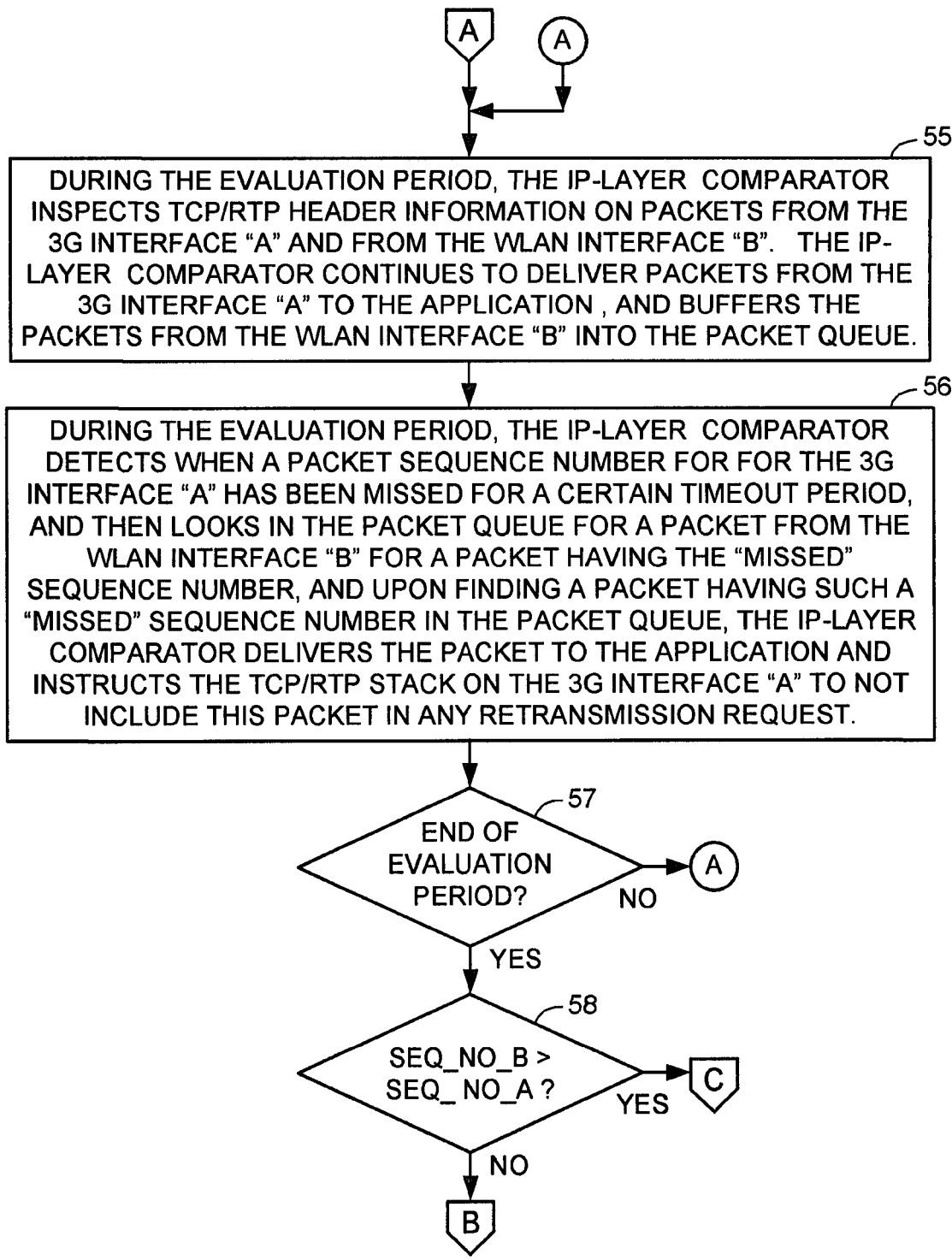

If there is a good signal from the WLAN transceiver, then execution branches from step 60 to step 61 to reset the evaluation period, and loop back from step 61 to step 55 of FIG. 4. For example, this is desirable if a mobile terminal is handing off from a high-speed interface "A" to a low-speed interface "B". While the high-speed interface is still valid, SEQ_NO_A will always be greater than SEQ_NO_B. However the high-speed interface may begin to fail (due to loss of coverage) at which point the IP-layer Comparator will switch over to the WLAN interface "B". This mode of operation allows the IP-layer Comparator to continue to track the packets.

In step 60, if there is not a good signal from the WLAN interface "B", then execution continues to step 62. In step 62, the WLAN interface "B" is de-registered by the IP-layer Comparator causing the mobile node to issue a Mobile IP registration request to the home agent with the S-bit=0 and the care-of address equal to the care-of address associated with the 3G interface "A" (IP1 in this case). This will have the effect of erasing the binding for the WLAN interface "B" while maintaining the binding for the 3G interface "A", and will stop the flow of traffic in the WLAN interface "B". Execution loops back from step 62 to step 52.

Figure 6:
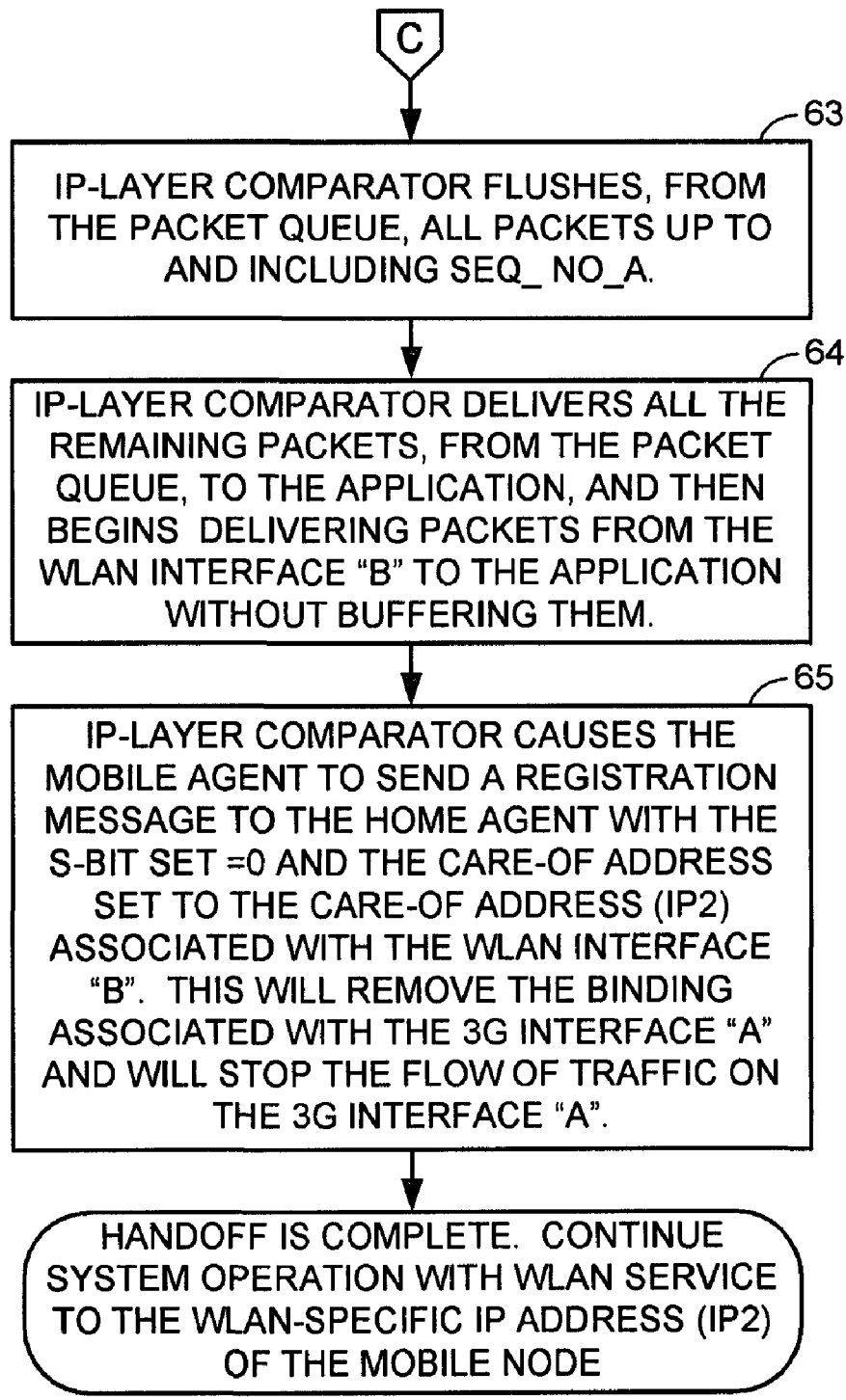

Execution branches from step 58 in FIG. 4 to step 63 in FIG. 6 when the IP-layer Comparator has concluded that the WLAN interface "B" has "caught up" to the 3G interface "A" and it is safe to start sending information from the WLAN interface "B" to the application. Therefore, in step 63 the IP-layer Comparator flushes, from the packet queue, all of the packets up to and including the packet having SEQ_NO_A, because the application will have already received those packets from the 3G interface "A". The IP-layer Comparator will then deliver all the remaining packets with sequence numbers greater than SEQ_NO_A to the application and will begin to deliver received packets from the WLAN interface "B" to the application without buffering them. Then in step 65, the IP-layer Comparator causes the mobile node to send a registration message to the home agent with the S-bit set to 0 and the care-of address set to the care-of address associated with the WLAN interface "B" (IP2 in this case). This will remove the binding associated with the 3G interface "A" at the Home Agent and stop the flow of traffic on the 3G interface "A". Thus the handoff is complete.

Figure 7:
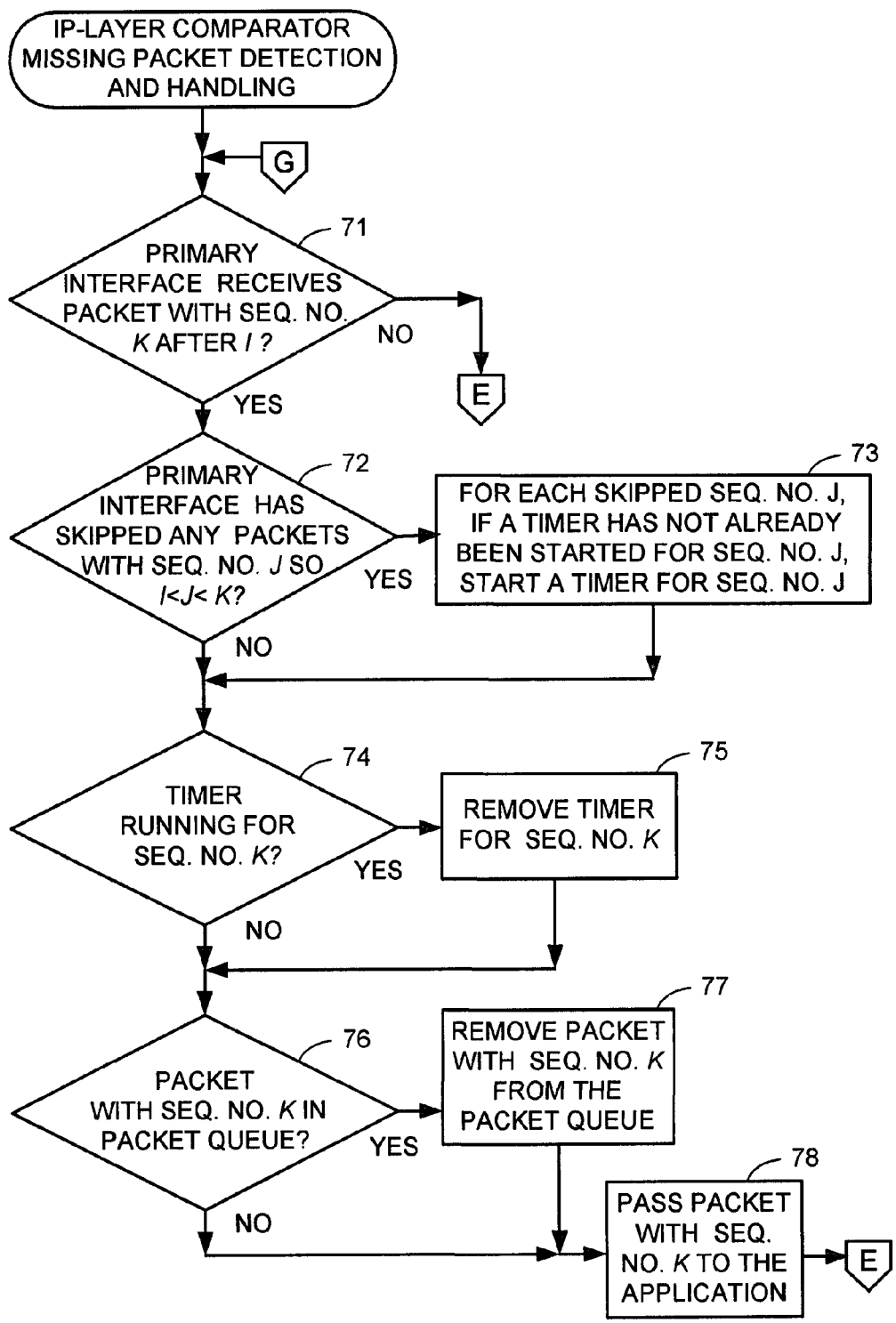
FIGS. 7 to 9 comprise a flowchart of programming of the IP-layer Comparator for detecting and handling missing packets.
Figure 8:
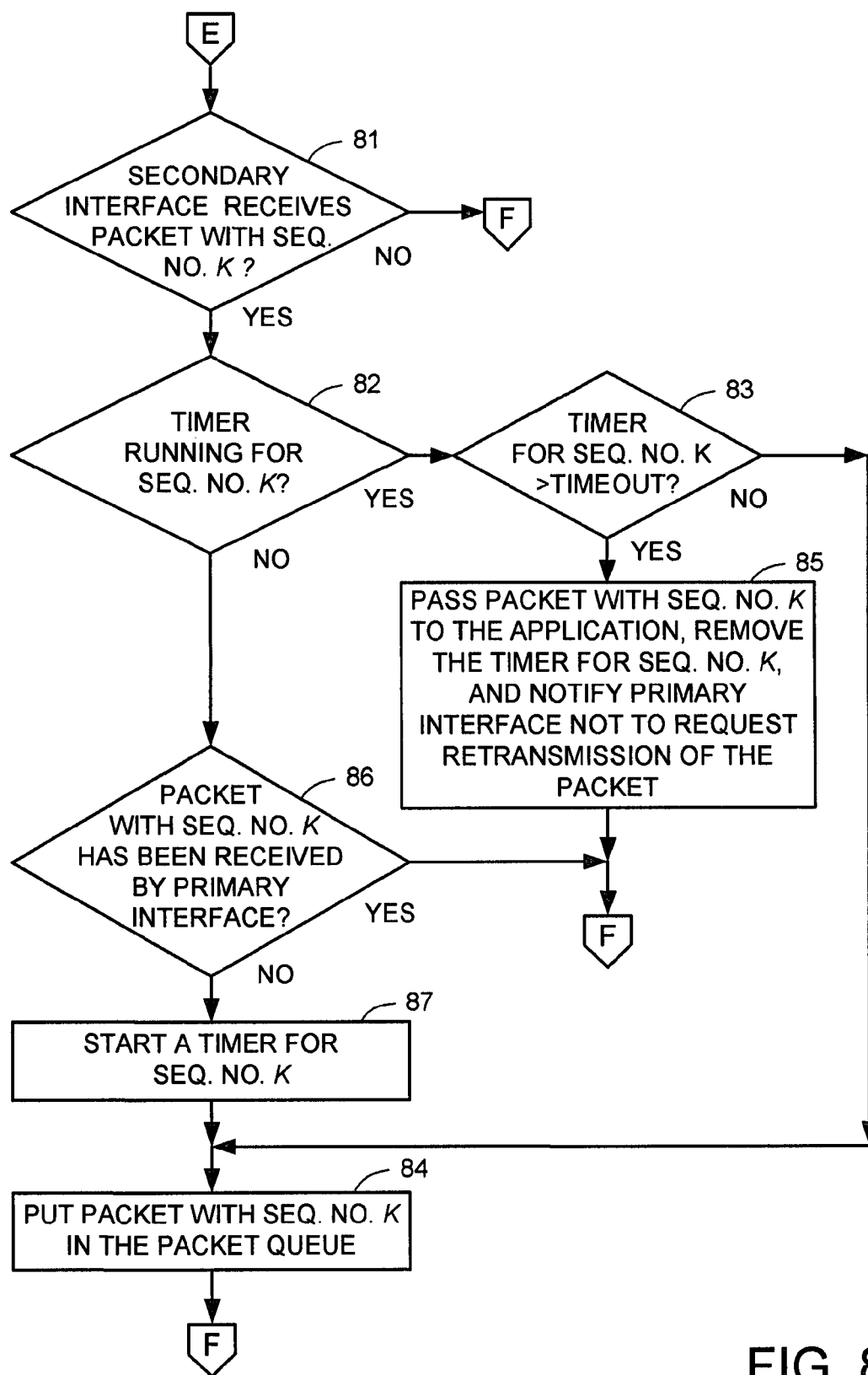
Figure 9:
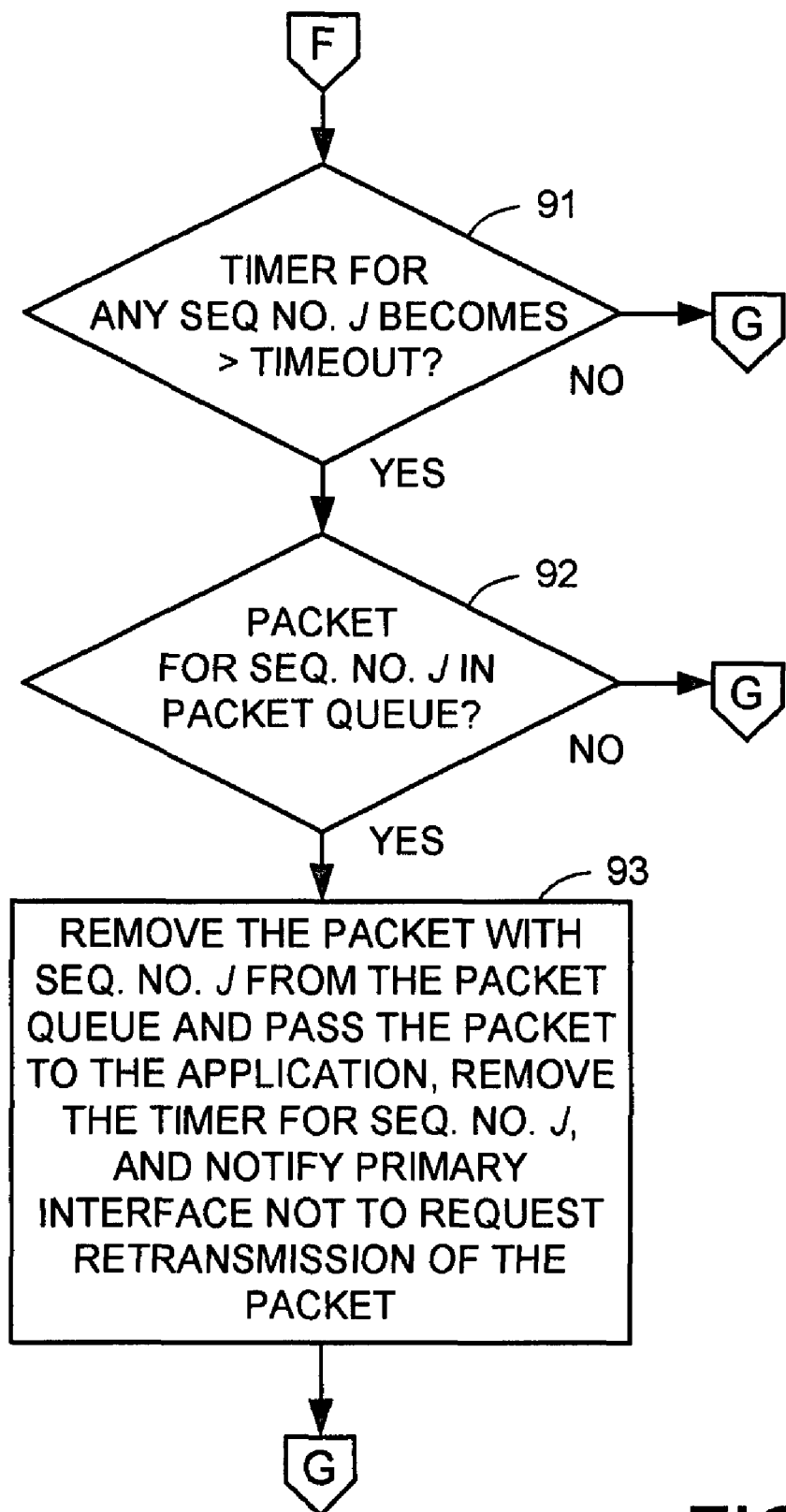

FIGS. 7 to 9 show a specific example of programming of the IP-layer Comparator for detecting and handling missing packets. In general, the IP-layer Comparator detects and handles missing packets in response to three events. As shown in FIG. 7, the IP-layer Comparator responds to the primary interface receiving a data packet. As shown in FIG. 7, the IP-layer Comparator responds to the secondary interface receiving a data packet. As show in FIG. 8, the IP-layer Comparator responds to expiration of a timer for the sequence number of a missing packet.

In a first step 71 of FIG. 7, when the primary interface receives a packet, execution continues to step 72. In step 72 the IP-layer comparator checks whether the primary interface has missed any packets having a sequence number J before the sequence number K of the packet just received in step 71 and after the sequence number I of the packet last received by the primary interface prior to the packet just received in step 72. If there are any such missed packets, execution branches to step 73. In step 73, for each skipped sequence number J, if a timer has not been started for the skipped sequence number, then the IP-layer Comparator starts a timer. For example, a timer can be started by placing an entry for the sequence number J into the packet queue, and setting a start time field of the entry to the present time. Execution continues from step 73 to step 74. Execution also continues to step 74 if no skipped packets are found in step 72.

In step 74, if there is a timer running for sequence number K, the execution branches to step 75 to remove the timer for the sequence number K. After step 75, execution continues to step 76. Execution also continues to step 76 if no timer was found in step 74 to be running for sequence number K.

In step 76, if a packet with sequence number K is found in the packet queue, then execution continues to step 77. In step 77, the IP-layer Comparator removes the packet with sequence number K from the packet queue. After step 77, execution continues to step 78. Execution also continues to step 78 if no packet with sequence number K was found in the packet queue.

In step 78, the packet with the sequence number K is passed to the application. After step 78, execution continues to step 81 in FIG. 8. Execution also continues to step 81 from step 71 if the primary interface has not received a new packet.

In step 81 of FIG. 8, if the secondary interface receives a new packet, then execution continues to step 82. In step 82, if a timer is running for the sequence number K of the new packet received by the secondary interface, then execution branches to step 83. In step 83, if the timer for the sequence number K has not expired (e.g., the timer was started at a time t1 and the present time is not greater than t1+TIMEOUT), then execution branches from step 83 to step 84. In step 84, the packet with the sequence number K is placed in the packet queue. In step 83, if the timer for the sequence number K has expired, then execution continues to step 85. In step 85, the IP-layer comparator passes the packet with the sequence number K to the application, removes the timer for the sequence number K, and notifies the primary interface not to request retransmission of the packet.

In step 82, if there was not a timer running for the sequence number K, then execution continues to step 86. In step 86, if the packet having the sequence number K has not been received by the primary interface, then execution continues to step 87. In step 87, the IP-layer Comparator starts a timer for the sequence number K. Execution continues from step 87 to step 84, to put the packet with the sequence number K in the packet queue. After step 84, execution continues to step 91 of FIG. 9. Execution also continues to step 91 of FIG. 9 from step 81 if the secondary interface has not received a new packet, and after step 85, and from step 86 if the packet with the sequence number K has been received by the primary interface.

In step 91 of FIG. 9, the IP-layer Comparator checks whether any of the timers have become expired. When a timer is found to have become expired, then execution continues to step 92. In step 92, the IP-layer Comparator checks whether the packet for the sequence number J of the expired timer is in the packet queue. If so, then execution continues to step 93. In step 93, the IP-layer Comparator removes the packet with the sequence number J from the packet queue and passes the packet to the application, and removes the timer for the sequence number J, and notifies the primary interface not to request retransmission of the packet. After step 93, execution loops back to step 71 of FIG. 7. Execution also loops back to step 71 of FIG. 7 from step 91 if no timer has been found to have become expired, and from step 92 if the packet queue does not include a packet for the sequence number of a timer that has been found to have become expired.

In view of the above, there has been described an IP-layer Comparator that provides seamless mobility during simultaneous bindings of IP addresses to a multiple interface device. By allowing simultaneous bindings, the MID is afforded the opportunity to evaluate network access networks at no cost or fear of packet loss that will disrupt applications. The IP-layer Comparator also ensures that seamless mobility can be achieved without packet loss and without the need for the so-called "fast handoff" technique, as it trades multipath routing diversity for speed of transferring associations. The IP-layer Comparator can be a valuable tool to enable interoperability between 3G and WLAN systems. Interoperability between 3G and WLAN systems is bolstered by the fact that many public WLANs will use DHCP and thus there will be no address conflict between the 3G and WLAN systems. The IP-layer Comparator also provides a natural platform on which an Intelligent Decision Framework can be implemented.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method of enabling seamless mobility for a multiple interface device in a co-located wireless environment in which data packets are transmitted to the multiple interface device from a first access network and identical data packets are transmitted concurrently to the multiple interface device from a second access network, the data packets including identifiers for identifying the data packets, the method comprising:

(a) the multiple interface device directly receiving a first stream of the data packet from the first access network at a first interface and directly receiving a second stream of the data packets from the second access network at a second interface, wherein some of the data packets that are transmitted to the multiple interface device from the first access network are not received by the first interface and are therefore missing from the first stream of the data packets; and (b) the multiple interface device inspecting the identifiers of data packets in the first stream and the identifiers of data packets in the second stream in order to combine data packets from the first stream with data packets from the second stream to produce a third stream of data packets received by an application of the multiple interface device, the third stream of data packets including said some of the data packets that are transmitted to the multiple interface device from the first access network and are not received by the first interface and are therefore missing from the first stream of the data packets, wherein the identifiers of the data packets in the first stream are not related to the identifiers of the data packets in the second stream; and (c) the multiple interface device, based on said inspecting in (b) above including based on detecting that data packets in a buffer of the second stream are missing from the first stream of packets, evaluates performance of said first or second access networks and renders a determination about whether to receive packets from said first access network or said second access network.

2. The method as claimed in claim 1, which includes the multiple interface device forwarding the data packets received from the first access network at the first interface to the application, storing in a buffer data packets received from the second access network at the second interface, and forwarding at least one data packet from the buffer to the application upon detecting that said at least one data packet is missing from the first stream of the data packets received from the first access network at the first interface.

3. The method as claimed in claim 2, wherein said at least one data packet is detected to be missing from the first stream of data packets when said at least one data packet has not been received at the first interface for more than a certain period of time after it has been received at the second interface.

4. The method as claimed in claim 2, which includes responding to receipt of said at least one data packet at the second interface by checking whether said at least one data packet has already been received at the first interface, and upon finding that said at least one data packet has not already been received at the first interface, starting a timer, and wherein said at least one data packet is forwarded from the buffer to the application upon expiration of the timer.

5. The method as claimed in claim 2, wherein the identifiers specify a sequence of the data packets, and said at least one data packet is detected to be missing from the first stream of data packets when the identifiers of data packets received at the first interface indicate that said at least one data packet is missing from the first stream of data packets received from the first access network at the first interface.

6. The method as claimed in claim 2, wherein the first interface is programmed to return a retransmission request to the first access network for a data packet that has been found to be missing from the first stream of data packets for a certain period of time unless the first interface is requested not to return a retransmission request for the data packet that has been found to be missing from the first stream of data packets for the certain period of time, and wherein the method includes requesting the first interface not to return a retransmission request for said at least one data packet upon finding that said at least one data packet is missing from the first stream of data packets.

7. The method as claimed in claim 2, which includes detecting that the data packets are being received at the second interface before the data packets are being received at the first interface, and upon detecting that the data packets are being received at the second interface before the data packets are being received at the first interface, passing the data packets received at the second interface to the application without storing the data packets received at the second interface in a buffer, and storing data packets received at the first interface in a buffer.

8. The method as claimed in claim 1, which includes the multiple interface device detecting that the second interface is failing to receive so many more of the data packets than the first interface that it is undesirable for the second access network to transmit the data packets from the second access network to the multiple interface device, and upon detecting that the second interface is failing to receive so many more of the data packets than the first interface that is undesirable for the second access network to transmit the data packets from the second access network to the multiple interface device, sending a request to the first access network or the second access network to terminate transmission of the data packets from the second access network to the multiple interface device.

9. A method of enabling seamless mobility for a multiple interface device in a co-located wireless Internet Protocol (IP) network environment in which IP data packets are transmitted to the multiple interface device from a first access network and identical IP data packets are transmitted concurrently to the multiple interface device from a second access network, the method comprising:

(a) the multiple interface device directly receiving a first stream of the IP data packets having a first set of IP addresses from the first access network at a first interface and directly receiving a second stream of the IP data packets having a second set of IP addresses not related to the first set of IP addresses from the second access network at a second interface, wherein some of the IP data packets that are transmitted to the multiple interface device from the first access network are not received by the first interface; and (b) the multiple interface device forwarding the IP data packets received from the first access network at the first interface to the application, storing in a buffer IP data packets received from the second access network at the second interface, and upon detecting that IP data packets in the buffer are missing from the first stream of the IP data packets received from the first access network at the first interface, forwarding the missing IP data packets from the buffer to the application; and (c) the multiple interface device, based on said detecting in (b) above including based on detecting that IP data packets in the buffer are missing from the first stream of IP data packets, evaluates performance of said first or second access networks and renders a determination about whether to receive packets from said first access network or said second access network.

10. The method as claimed in claim 9, wherein at least one IP data packet in the buffer is detected to be missing from the first stream of IP data packets when said at least one IP data packet has not been received at the first interface for more than a certain period of time after said at least one IP data packet has been received at the second interface.

11. The method as claimed in claim 9, which includes responding to receipt of at least one IP data packet at the second interface by checking whether said at least one IP data packet has already been received at the first interface, and upon finding that said at least one IP data packet has not already been received at the first interface, starting a timer, and wherein said at least one IP data packet is forwarded from the buffer to the application upon expiration of the timer.

12. The method as claimed in claim 9, wherein the IP data packets include information specifying a sequence of the IP data packets, and at least one of the IP data packets is detected to be missing from the first stream of IP data packets when the specified sequence of the IP data packets indicates that said at least one of the IP data packets is missing from the first stream of IP data packets received from the first access network at the first interface.

13. The method as claimed in claim 9, wherein the first interface is programmed to return a retransmission request to the first access network for an IP data packet that has been found to be missing from the first stream of IP data packets for a certain period of time unless the first interface is requested not to return a retransmission request for the IP data packet that has been found to be missing from the first stream of IP data packets for the certain period of time, and wherein the method includes requesting the first interface not to return a retransmission request for at least one IP data packet upon finding that said at least one IP data packet is missing from the first stream of IP data packets and is found in the buffer.

14. The method of claim 1, wherein the determination rendered in (c) includes to discontinue receipt of packets from said first access network.

15. The method of claim 9, wherein the determination rendered in (c) includes to discontinue receipt of packets from said first access network.

16. The method of claim 14, wherein the determination rendered in (c) includes to discontinue receipt of packets from said first access network when an IP comparator determines that an input stream from the second access network has caught up with an input stream from the first access network.

17. The method of claim 15, wherein the determination rendered in (c) includes to discontinue receipt of packets from said first access network when an IP comparator determines that an input stream from the second access network has caught up with an input stream from the first access network.

18. The method of claim 1, further including upon detecting of packets not being received from the first access network, determining not to request retransmission from said first access network.

19. The method of claim 9, further including upon detecting of packets not being received from the first access network, determining not to request retransmission from said first access network.

20. The method of claim 1, further including upon detecting of packets not being received from the first access network, determining to request retransmission from said second access network.

21. The method of claim 9, further including upon detecting of packets not being received from the first access network, determining to request retransmission from said second access network.

22. A multiple interface device having seamless in a co-located wireless environment in which data packets are transmitted to the multiple interface device from a first access network and identical data packets are transmitted concurrently to the multiple interface device from a second access network, the data packets including identifiers for identifying the data packets, comprising:

(a) said multiple interface device being configured to directly receive a first stream of the data packet from the first access network at a first interface and to directly receive a second stream of the data packets from the second access network at a second interface, wherein some of the data packets that are transmitted to the multiple interface device from the first access network are not received by the first interface and are therefore missing from the first stream of the data packets; and (b) said multiple interface being configured to inspect the identifiers of data packets in the first stream and the identifiers of data packets in the second stream in order to combine data packets from the first stream with data packets from the second stream to produce a third stream of data packets received by an application of the multiple interface device, the third stream of data packets including said some of the data packets that are transmitted to the multiple interface device from the first access network and are not received by the first interface and are therefore missing from the first stream of the data packets, wherein the identifiers of the data packets in the first stream are not related to the identifiers of the data packets in the second stream; and (c) said multiple interface device being configured to evaluate, based on said inspecting in (b) above including based on detecting that data packets in a buffer of the second stream are missing from the first stream of packets, performance of said first or second access networks and to render a determination about whether to receive packets from said first access network or said second access network.

* * * * *